United States Patent
Dean et al.

(10) Patent No.: US 8,495,483 B1
(45) Date of Patent: Jul. 23, 2013

(54) USING TEXT SURROUNDING HYPERTEXT LINKS WHEN INDEXING AND GENERATING PAGE SUMMARIES

(75) Inventors: Jeffrey A. Dean, Menlo Park, CA (US); Martin Farach-Colton, New York, NY (US); Sanjay Ghemawat, Mountain View, CA (US); Benedict Gomes, Mountain View, CA (US); Georges R. Hank, Mountain View, CA (US)

(73) Assignee: Google Inc., Mountain View, CA (US)

( * ) Notice: Subject to any disclaimer, the term of this patent is extended or adjusted under 35 U.S.C. 154(b) by 443 days.

(21) Appl. No.: 10/386,110

(22) Filed: Mar. 12, 2003

Related U.S. Application Data

(60) Provisional application No. 60/363,559, filed on Mar. 13, 2002.

(51) Int. Cl.
 *G06F 17/00* (2006.01)
 *G06F 17/30* (2006.01)
(52) U.S. Cl.
 USPC .......................................... 715/205; 715/209
(58) Field of Classification Search
 USPC ...... 715/501.1, 517, 526, 530, 500, 206–208, 715/230, 205; 707/3, 104.1, 5; 386/112, 96; 352/56
 See application file for complete search history.

(56) References Cited

U.S. PATENT DOCUMENTS

| | | | | |
|---|---|---|---|---|
| 5,572,643 | A * | 11/1996 | Judson | 709/218 |
| 5,802,299 | A * | 9/1998 | Logan et al. | 709/218 |
| 6,651,058 | B1 * | 11/2003 | Sundaresan et al. | 707/6 |
| 6,651,059 | B1 * | 11/2003 | Sundaresan et al. | 707/6 |
| 6,670,968 | B1 * | 12/2003 | Schilit et al. | 715/760 |
| 6,745,161 | B1 * | 6/2004 | Arnold et al. | 704/7 |
| 6,763,496 | B1 * | 7/2004 | Hennings et al. | 715/501.1 |
| 6,968,332 | B1 * | 11/2005 | Milic-Frayling et al. | 707/723 |
| 7,017,114 | B2 * | 3/2006 | Guo et al. | 715/247 |
| 7,155,489 | B1 * | 12/2006 | Heilbron et al. | 709/217 |
| 7,162,493 | B2 * | 1/2007 | Weiss et al. | 1/1 |
| 7,779,002 | B1 * | 8/2010 | Gomes et al. | 707/728 |
| 2001/0049700 | A1 * | 12/2001 | Ichikura | 707/512 |
| 2003/0001900 | A1 * | 1/2003 | Cabanes et al. | 345/810 |
| 2003/0146939 | A1 * | 8/2003 | Petropoulos et al. | 345/810 |
| 2003/0208482 | A1 * | 11/2003 | Kim et al. | 707/3 |
| 2003/0221167 | A1 * | 11/2003 | Goldstein et al. | 715/513 |
| 2004/0215664 | A1 * | 10/2004 | Hennings et al. | 707/104.1 |
| 2007/0106956 | A1 * | 5/2007 | Platt et al. | 715/808 |
| 2010/0223257 | A1 * | 9/2010 | Milic-Frayling et al. | 707/722 |

OTHER PUBLICATIONS

Creswell, Nick et al. "Effective Site Finding using Link Anchor Information", Sep. 2001, SIGIR '01: Proceedings of the 24th annual international ACM SIGIR conference on Research and development in information retrieval, ACM Database.*

(Continued)

*Primary Examiner* — Doug Hutton, Jr.
*Assistant Examiner* — Ariel Mercado
(74) *Attorney, Agent, or Firm* — Fish & Richardson P.C.

(57) ABSTRACT

Web quotes are gathered from web pages that link to a web page of interest. The web quote may include text from the paragraphs that contain the hypertext links to the page of interest as well as text from other portions of the linked web page, such as text from a nearby header. The obtained web quotes may be ranked based on quality or relevance and may then be incorporated into a search engine's document index or into summary information returned to users in response to a search query.

14 Claims, 5 Drawing Sheets

OTHER PUBLICATIONS

Amitay, Einat, "Automatically summarizing web sites: is there a way around it?", Conference on Information and Knowledge Management, Proceedings of the ninth international conference on Information and knowledge management, McLean, Virginia, United States, pp. 173-179, Year of Publication: 2000, ISBN:1-58113-320-0.*

Gross, Katie and Lee Ann Schruender, "Snippet Based Relevance Calculations", Villanova University, pp. 1-3, 2002.*

Chakrabarti, Soumen, et al., "Automatic resource compilation by analyzing hyperlink structure and associated text", Computer Networks and ISDN Systems 30, 1998, pp. 65-74.*

Amitay, Einat, "Using common hypertext links to idetnify the best phrasal description of target web documents", pp. 1-5, 1998.*

Amitay, E.: "Automatically Summarising Web Sites—Is There a Way Around It?" ACM $9^{th}$ International Conference on Information and Knowledge Management (CIKM 2000), Washington, D.C., 7 pages.

Amitay, E.: "Anchors in Context: A corpus analysis of web pages authoring conventions," in *Words on the Web-Computer Mediated Communication*, Lynn Pemberton & Simon Shurville eds., Intellect Books, UK, Oct. 1999, 12 pages.

Amitay, E.: "InCommonSense—Rethinking Web Search Results," IEEE International Conference on Multimedia and Expo (ICME 1000), New York, NY, 4 pages.

Brin et al., "The Anatomy of a Large-Scale Hypertextual Web Search Engine," Computer Science Department, Stanford University, 1998, 20 pages.

* cited by examiner

301 — Computers > Algorithms > Compression

302 — Data Compression Reference Center — Basic facts, algorithms, 310
hardware links, a glossary, and more.

303 — Source Coding/Data Compression Pointers — By Mitsuharu ARIMURA
311

304 — 3D Graphics Compression Homepage — a directory of 3D graphics
compression information, researchers, and commercial products 312
on the web.

305 — Universal Source Coding — Research paper and presentation
relating to the Lempel Ziv data compression algorithm, among 313
others.

Fig. 3

USING TEXT SURROUNDING HYPERTEXT LINKS WHEN INDEXING AND GENERATING PAGE SUMMARIES

REFERENCE TO RELATED APPLICATIONS

This application claims priority under 35 U.S.C. §119 based on U.S. Provisional Application No. 60/363,559, filed Mar. 13, 2002.

BACKGROUND OF THE INVENTION

A. Field of the Invention

The present invention relates generally to search engines and, more particularly, to systems and methods that use text surrounding hypertext links to improve search results.

B. Description of Related Art

The World Wide Web ("Web") contains a vast amount of information. Locating a desired portion of information, however, can be challenging. This problem is compounded because the amount of information on the web and the number of new users inexperienced at web searching are growing rapidly.

Search engines attempt to return links to web pages in which a user is interested. Generally, search engines base their determination of the user's interest on search terms (called a search query) entered by the user. The goal of the search engine is to identify links to high quality relevant results for the user based on the search query. Typically, the search engine accomplishes this by matching the terms in the search query to a corpus of pre-stored web pages. Web pages that contain the user's search terms are considered "hits" and are returned to the user.

Search engines generally organize their corpus of pre-stored web page documents as an inverted index of terms found in the web pages. Terms in a search query can be quickly referenced against the index to determine the set of documents that contain some or all of the terms. In one technique for improving the quality of a document index, additional terms found near hyperlinks in documents are used to enhance the description of the linked document. The premise of this technique is that web authors tend to describe or comment about the content of other web pages in descriptive text located near the link to the other web page. This descriptive text may be used when indexing the linked document to enhance the quality of the index. As a concrete example of this technique, consider a first web page that includes a hyperlink to a target web page dealing with data compression techniques. The first web page may describe the target web page with the descriptive text "basic facts, algorithms, hardware links, and a glossary." By including the descriptive text of the first web page in the text of the target web page when indexing the target web page, the search engine can generate a more comprehensive document index.

In a variation of the above technique, the descriptive text may be used when returning search results to a user. The idea here is that the descriptive text, in many situations, accurately summarizes the linked web page. Accordingly, in response to a search query, the search engine may return the list of relevant web pages along with corresponding descriptive text that was gathered from pages that link to the web page.

One problem associated with using descriptive text from a web page to evaluate a linked web page is that there are often multiple linking web pages, and thus multiple samples of descriptive text from which to choose. Automatically choosing the best sample of descriptive text can be a difficult task.

The overriding goal of a search engine is to return the most desirable set of links, with a succinct and accurate description of each link, for any particular search query. To this end, it is desirable to improve the quality of any external descriptive text associated with a particular web page.

SUMMARY OF THE INVENTION

Systems and methods consistent with the present invention address this and other needs by providing an improved search engine that effectively generates and uses samples of descriptive text.

One aspect of the present invention is directed to a method for generating descriptive text for a target document. The method comprises a number of acts, including identifying documents that contain hyperlinks to the target document and selecting text from the documents in the set at locations determined by blocks that contain the hyperlinks. Additionally, the method adds text to the selected text for the identified documents based on information external to the blocks that contain the hyperlinks, and stores, for each of the identified documents, the selected text and the added text as descriptive text associated with the target document.

A second method consistent with the present invention is a method for searching an index. The method comprises matching terms in a search query to the index and generating a list of documents relevant to the search query based on the matching of the terms of the index. Further, the method includes retrieving descriptive text for the documents in the generated list, the descriptive text for a particular one of the documents in the generated list being based on a ranking of text derived from portions of documents that contain hyperlinks to the particular one of the documents. Still further, the method outputs the documents in the list and the descriptive text associated with the documents in the list.

Yet another aspect of the present invention is a method of adding a document to an index. The method includes examining documents that contain at least one hyperlink to the document, generating web quotes for the document from the examined documents, each of the web quotes corresponding to one of the examined documents, and ranking the web quotes based on a quality metric associated with the web quotes of the examined documents. Further, the document is included in the index along with at least one of the web quotes based on the ranking of the web quotes.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram illustrating an exemplary document rendered from an HTML page;

DETAILED DESCRIPTION

The following detailed description of the invention refers to the accompanying drawings. The detailed description does not limit the invention. Instead, the scope of the invention is defined by the appended claims and equivalents.

As described herein, descriptive text, referred to as a web quote, is gathered from web pages that link to a web page of interest. The web quote may include text from the paragraphs that contain the hypertext links to the page of interest as well as text from other portions of the linking web page, such as text from a nearby header. The obtained web quotes may be ranked based on quality or relevance and may then be incorporated into the search engines' document index or into summary information returned to users in response to a search query.

Figure 1:
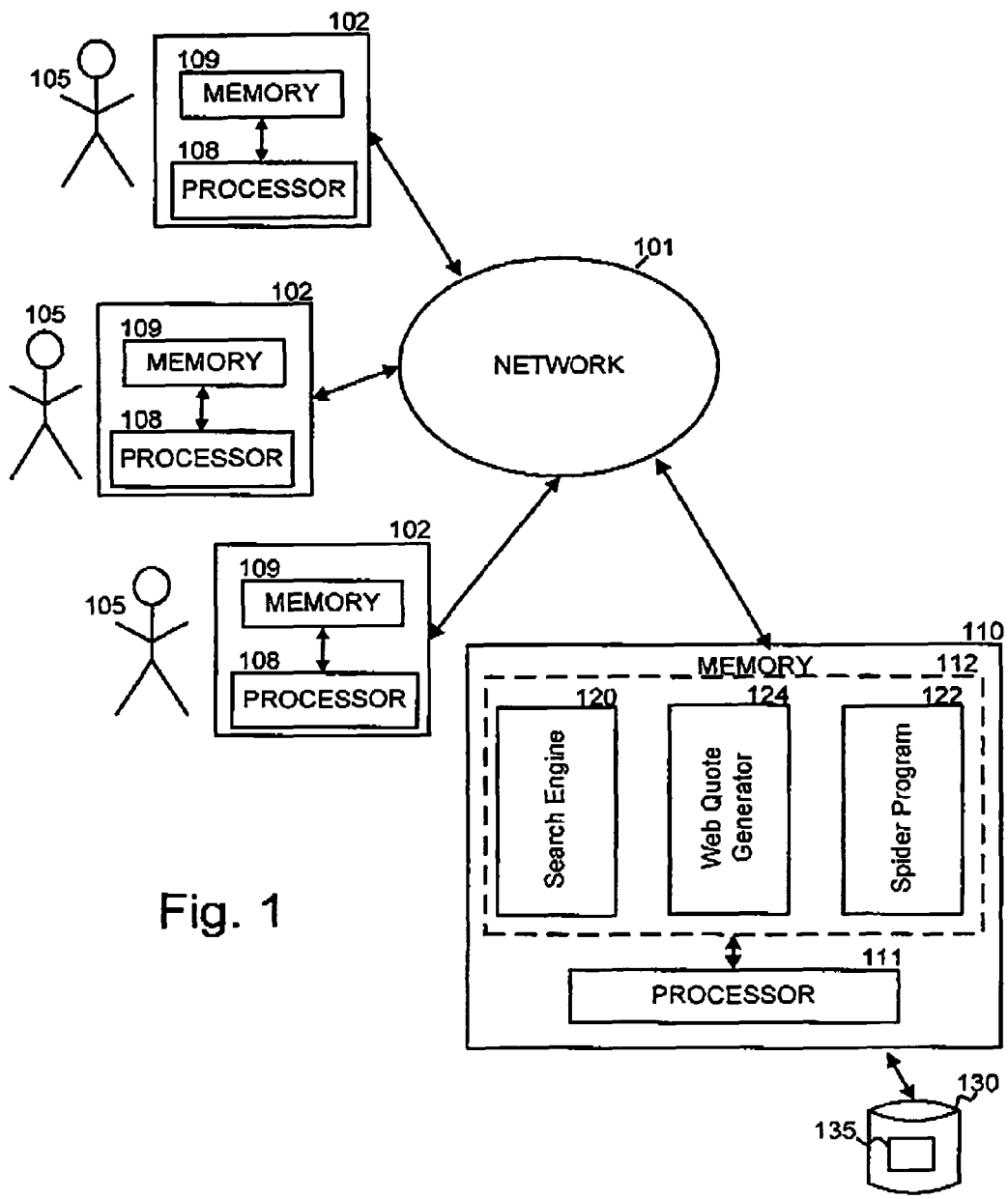
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may be, for example, the Internet. Each of the client devices 102 may include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer-readable medium 112. Server device 110 may additionally include a secondary storage element, such as database 130.

Client processors 108 and server processor 111 can be any conventional computer processor, such as processors from Intel Corporation, of Santa Clara, Calif. In general, client device 102 may be any type of computing platform connected to a network that interacts with application programs, such as a personal computer, a digital assistant, or a "smart" Cellular telephone or pager. Server 110, although depicted as a single computer system, may be implemented as a network of computer processors.

Memory 112 may contain a number of programs, such as search engine program 120, spider program 122, and web quote generator program 124. Search engine program 120 locates relevant information in response to search queries from users 105. In particular, users 105 send search queries to server device 110, which responds by returning a list of relevant information to the user 105. Typically, users 105 ask server device 110 to locate web pages relating to a particular topic and stored at other devices or systems connected to network 101 or another network.

Search engine program 120 may access database 130 to obtain results from a document corpus 135, stored in database 130, by comparing the terms in the user's search query to the documents in the corpus. The information in document corpus 135 may be gathered by spider program 122, which "crawls" web documents on network 101 based on their hyperlinks. As a result, spider program 122 generates a tree of linked web documents. The crawled documents may be stored in database 130 as an inverted index in which each term in the corpus is associated with all the crawled documents that contain that term.

In one embodiment consistent with the principles of the present invention, the inverted index associates, for any particular document, the explicit words of that document as well as terms from other documents that link to the particular document. The terms from the other documents are referred to as web quotes, which may be generated by web quote generator 124.

Figure 2:
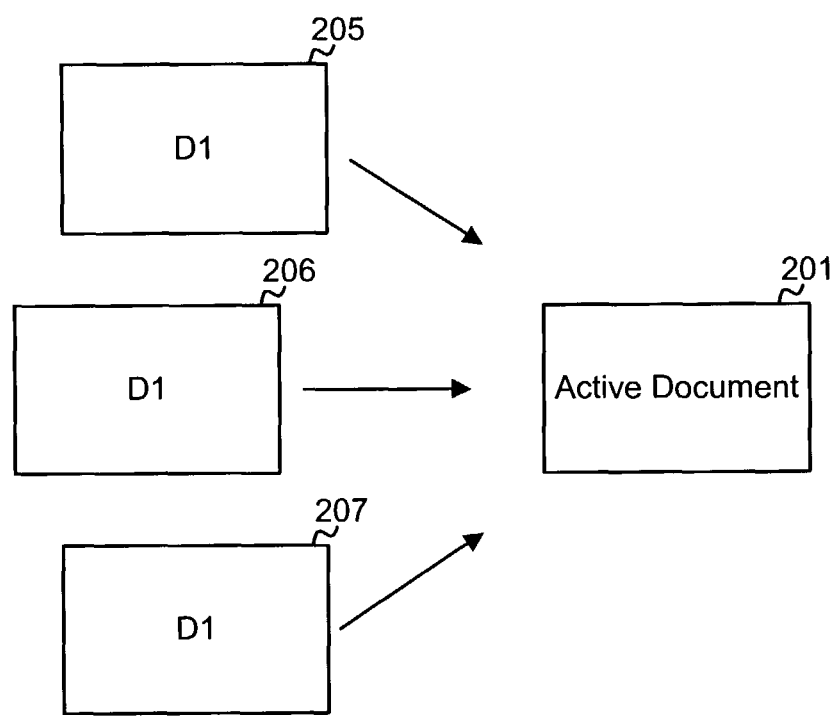
FIG. 2 is a diagram illustrating relations between an exemplary set of web pages.

FIG. 2 is a diagram illustrating relations between an exemplary set of web pages gathered by spider program 122. Document 201 is the active web document under consideration for indexing. This document may be accessed by web quote generator 124. Documents 205-207 contain links to document 201.

In the nomenclature of the popular hyper-text markup language (HTML) standard, hyperlinks to other documents are specified using an HTML structure called an anchor. An anchor specifies the URL (uniform resource locator) of the site being linked. Typically, browsers display anchors as text distinct from the main text (such as via underlying or displaying in a different color). A user, by selecting the anchor, causes the browser to retrieve the web page specified by the URL. In FIG. 2, documents 205-207 each contain an anchor that links to document 201.

FIG. 3 is a diagram illustrating an exemplary rendered HTML page 300. The page may, for example, be from one of linking documents 205-207, such as linking document 205. The illustrated page is a directory that includes header information 301 and anchors 302-305 (shown as underlined text). Following anchors 302-305 is descriptive text 310-313 that describes the linked page. If, for example, anchor 302 is a link from document 205 to document 201, text 310 describes document 201. Header 301 also describes document 201. The aggregate of the terms in the HTML code of HTML page 300 that relates to document 201 is referred to as a web quote for document 201.

Figure 4:
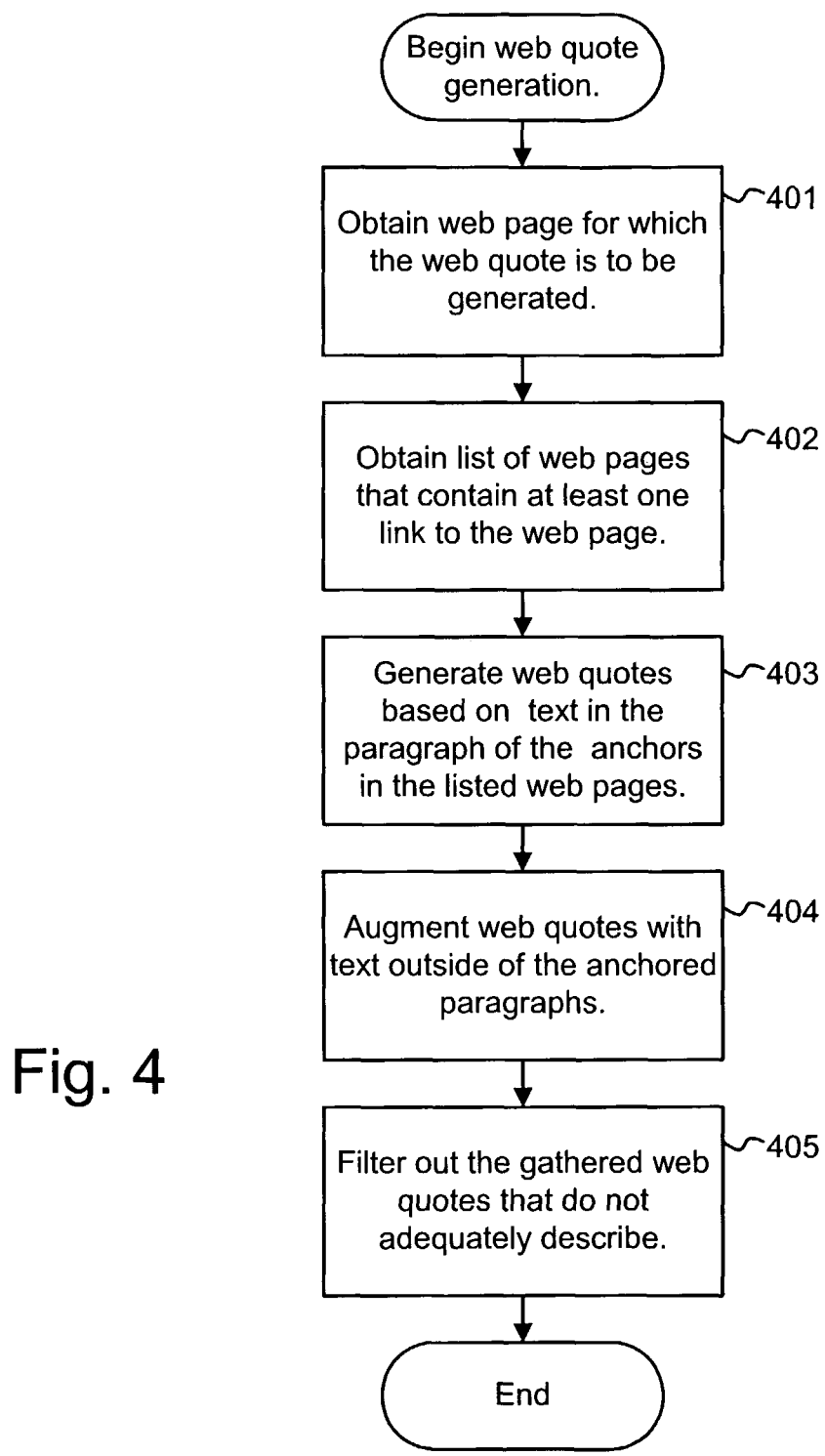
FIG. 4 is a flow chart illustrating methods consistent with the present invention for gathering web pages and web quotes relating to the gathered web pages.

FIG. 4 is a flow chart illustrating methods consistent with the present invention for the operation of web quote generator 124 in gathering web quotes relating to the gathered web pages. Web quote generator 124 begins by retrieving a web page from database 130 or from network 101. (Act 401). The web quote generator 124 then queries database 130 for a list of web pages that contain a link to the retrieved web page. (Act 402).

For the web page in the list, web quote generator 124 generates a web quote based on text surrounding the anchors that link to the retrieved page. (Act 403). In one implementation, web quote generator 124 generates the web quote by examining a block of text, such as a paragraph, containing each anchor (paragraphs are generally delineated in HTML by the pair of control characters "<p>" and "</p>"). In one embodiment, paragraphs that begin with an anchor followed by text, and that have no other anchor until the end of the paragraph, are considered to be likely candidates to contain useful descriptive text. Other HTML separators, such as line separators, may alternatively be used instead of paragraphs.

Consistent with an aspect of the present invention, web quote generator 124 may augment the web quotes obtained in Act 403 based on text in the web page located outside of the paragraph that contains the anchor. (Act 404). One example of this type of information is web page header information. In FIG. 3, for example, the text "Computers>Algorithms>Compression" is denoted by HTML control characters as being a header in the HTML document. Web quote generator 124 may incorporate header text in its generated web quotes.

Gathered web quotes may be additionally filtered by web quote generator 124 to remove web quotes that do not adequately describe a given web page. (Act 405). Such a filter may be constructed based on an empirical observation of features present in good web quotes. The features used, may include, for example, the web quote's length, punctuation, use of verbs, positions of verbs, use of adjectives, etc. Other filtering techniques are possible. For example, a number of similar or identical web quotes may point to a single web page. The set of similar or identical web quotes may be pruned to just one web quote. Alternately, a set of similar or identical web quotes may point to different web pages. This set of web quotes may be filtered based on a quality metric applied to the pointed-to web pages. Web quotes pointing to pages that have a low quality metric may be eliminated. One useable quality metric is Page Rank. The Page Rank technique is described in the article entitled "The Anatomy of a Large-Scale Hypertextual Search Engine," by Sergey Brin and Lawrence Page.

Through the acts shown in FIG. 4, web quote generator 124 can generate useful web quotes for a web page. Although described in the context of downloading web pages from network 101, web quotes could alternately be generated for web pages that are pre-stored in database 130.

Web quotes generated by web quote generator 124 for a particular document may be initially assigned a value based on their quality. (Act 501). The value can be assigned based on a quality metric applied to the source page of the web quote. The quality metric can be, for example, the Page Rank technique. Page Rank assigns an importance value to a web page based on its content and also based on the link structure of the web page. In contrast to prior techniques for quantifying the importance of a web page based solely on the contents of the web page, the Page Rank technique attempts to quantify the importance of a web page based on more than just the content of the web page.

Based on the assigned quality values, the web quotes may be sorted, (Act 502), and one or more of the web quotes, for example, the highest ranking web quote, may be used by search engine 120. (Act 503). The search engine 120 may use the web quotes by returning the web quotes to the user in response to a search query as a "snippet" of text summarizing the web page. Alternately, search engine 120 may integrate the highest ranking web quote, or a predetermined number of the highest ranking web quotes, into the index of the document corpus 135, such that the web quotes are associated in the index with the document to which they link, in addition to or in place of a text snippet otherwise returned.

Figure 5:
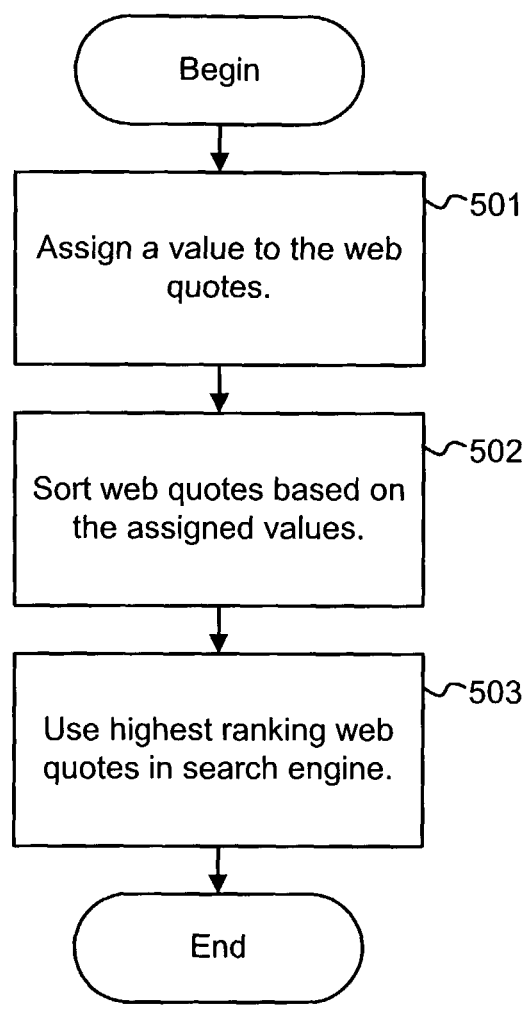
FIG. 5 is a flow chart illustrating methods consistent with the present invention for performing a search based on the gathered web quotes.

Web quotes gathered by web quote generator 124 may later be used by search program 120 in identifying relevant documents in response to search queries from users 105. FIG. 5 is a flow chart illustrating methods consistent with the present invention for responding to a search query. As one example, search engine 120 may integrate the highest ranking web quote, or a predetermined number of the highest ranking web quotes, into the index of the document corpus 135, such that the web quotes are associated in the index with the document to which they link.

Instead of assigning quality values to web quotes using a technique such as the Page Rank technique, an alternate method consistent with the present invention for assigning values to web quotes may be based on a match of the user's search terms to the web quotes. Web quotes more closely related to the user's search terms may be given higher values.

As described above, web quotes based on documents that link to documents of interest are used to enhance a search engine. The web quotes may be generated based on text in the same paragraph as an anchor, as well as on additional text, such as header information. When multiple web quotes are generated for a particular document, the particular web quotes to use may be determined based on, for example, a ranking of the web quotes. The web quotes may be ranked based on the quality of the underlying linking page or the quality of the web quote relative to a user's search query.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed the operation of search engine 120 in the context of a search of documents on the world wide web, search engine 120 could be implemented on any corpus. Moreover, while series of acts have been presented with respect to FIGS. 4 and 5, the order of the acts may be different in other implementations consistent with the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method comprising:
    selecting, by one or more processors, a plurality of documents,
        each document, of the plurality of documents, including a hyperlink that points to a target document;
    generating, by one or more processors, a web quote from each document in the plurality of documents, using selected text from the document,
        where, for each document in the plurality of documents, the selected text from the document is included in a paragraph in the document that includes the hyperlink,
        the paragraph including less than an entire content of the document;
    augmenting, by one or more processors, the web quote, for each document, of the plurality of documents, by incorporating text that is both located in the document and outside of the selected text, into the web quote;
    determining a metric of quality of each document of the plurality of documents;
    ranking the web quotes based on the metric of quality of each document of the plurality of documents from which the web quote is generated;
    selecting, by one or more processors, one of the web quotes based on the ranking of the web quotes;
    storing, by one or more processors and in an entry, of a plurality of entries in an index, information associating the target document with a corresponding term appearing in the target document;
    storing, by one or more processors and in another entry, of the plurality of entries in the index, information associating the target document with a web quote term,
        the web quote term appearing in the selected web quote and not appearing in the target document;
    receiving, by one or more processors, information identifying the target document as relevant to a search query based on the web quote term,
        the received information being generated based on information included in the index; and
    providing, by one or more processors, information regarding the target document and the selected web quote based on receiving the information identifying the target document as relevant to the search query.

2. The method of claim 1, where, for each document, of the plurality of documents, the selected text includes text beginning after the hyperlink and continuing to an end of the paragraph that includes the hyperlink.

3. The method of claim 2, further comprising:
selecting text from each document, of the plurality of documents, only when the paragraph that includes the hyperlink is structured as a paragraph that begins with the hyperlink, is followed by the text, and includes no additional hyperlinks.

4. The method of claim 1, where the incorporated text is text that precedes the paragraph including the hyperlink.

5. The method of claim 4, where, for each document, of the plurality of documents, the incorporated text and the paragraph are selected by examining hypertext-markup language (HTML) of the document.

6. The method of claim 1, where the metric is determined using a technique based on a link structure of web pages.

7. The method of claim 1, where at least one of the plurality of documents is a web page.

8. The method of claim 1, further comprising:
filtering the web quotes based on predetermined criteria; and
removing an association of one or more of the web quotes with the target document based on the filtering.

9. The method of claim 1, where augmenting the web quote for each document, of the plurality of documents, includes:
incorporating, for each document, of the plurality of documents, text from a header of the document into the selected text.

10. A non-transitory memory device storing instructions, the instructions comprising:
one or more instructions which, when executed by at least one processor, cause the at least one processor to select a plurality of documents,
where each document, of the plurality of documents, includes a hyperlink to a target document;
one or more instructions which, when executed by the at least one processor, cause the at least one processor to select, for each document of the plurality of documents, text from the document,
where the selected text from the document is included in a paragraph in the document that includes the hyperlink, the selected text including less than an entire content of the document;
one or more instructions which, when executed by the at least one processor, cause the at least one processor to incorporate, for each document of the plurality of documents, text from a header of the document into the selected text;
one or more instructions which, when executed by the at least one processor, cause the at least one processor to associate the selected texts including the incorporated texts from the headers, with the target document;
one or more instructions which, when executed by the at least one processor, cause the at least one processor to filter the selected texts with the incorporated text from the headers, based on predetermined criteria to select one or more of the selected texts with the incorporated text from the headers, as descriptive text that describes the target document;
one or more instructions which, when executed by the at least one processor, cause the at least one processor to rank the descriptive text based on a linking structure of each document, of the plurality of documents,
where the linking structure, for each document, of the plurality of documents, is determined by a probability distribution that represents a likelihood that a user, randomly clicking on links, will arrive at the document;
one or more instructions which, when executed by the at least one processor, cause the at least one processor to select one of the descriptive text based on the ranking
one or more instructions which, when executed by the at least one processor, cause the at least one processor to store, in an entry, of a plurality of entries in an index, information associating the target document with a corresponding term appearing in the target document; and
one or more instructions which, when executed by the at least one processor, cause the at least one processor to store, in another entry, of the plurality of entries in the index, information associating the target document with a descriptive text term,
the descriptive text term appearing in the selected descriptive text and not appearing in the
one or more instructions which, when executed by the at least one processor, cause the at least one processor to receive information identifying the target document as relevant to a search query based on the descriptive text term,
the received information being generated based on information included in the index; and
one or more instructions which, when executed by the at least one processor, cause the at least one processor to provide information regarding the target document and the selected descriptive text based on receiving the information identifying the target document as relevant to the search query.

11. The memory device of claim 10, where the predetermined criteria comprise at least one of a length of the selected texts and the texts from the headers, punctuation present in the selected texts and the texts from the headers, verbs present in the selected texts and the texts from the headers, positions of verbs present in the selected texts and the texts from the headers, and adjectives present in the selected texts and the texts from the headers.

12. The memory device of claim 10, where the predetermined criteria are criteria based on features determined to be present in descriptive text that adequately describe a web page.

13. A system, comprising:
one or more server devices to:
identify documents that include links that point to a particular document;
identify, within each of a plurality of the identified documents and for each of the links included within each of the plurality of the identified documents that point to the particular document, a paragraph of text that includes the link,
the paragraph of text including less than all text from the identified document;
generate, for each of the plurality of the identified documents and for each of the links included within each of the plurality of the identified documents that point to the particular document, a respective web quote that includes text from the paragraph of text and text located within the identified document and external to the paragraph of text;
assign a quality score to each of the respective web quotes based on a quality score of the identified document from which the respective web quote was generated;
select one of the respective web quotes based on the quality score assigned to the one of the respective web quotes;

store, in an entry, of a plurality of entries in an index, information associating the particular document with a corresponding term appearing in the particular document;

store, in another entry, of the plurality of entries in the index, information associating the particular document with a web quote term, the web quote term appearing in the selected web quote and not appearing in the particular document;

receive information identifying the particular document as relevant to a search query based on the web quote term, the received information being generated based on information included in the index; and provide information regarding the particular document and the selected web quote based on receiving the information identifying the particular document as relevant to the search query.

14. The system of claim 13, where the one of the respective web quotes is provided, within a list of search results, as a snippet associated with the particular document.

\* \* \* \* \*

UNITED STATES PATENT AND TRADEMARK OFFICE
CERTIFICATE OF CORRECTION

PATENT NO. : 8,495,483 B1
APPLICATION NO. : 10/386110
DATED : July 23, 2013
INVENTOR(S) : Jeffrey A. Dean It is certified that error appears in the above-identified patent and that said Letters Patent is hereby corrected as shown below:

Title Page, Item (75) Inventors, line 5-6: please delete "Georges R. Hank" and insert therefor -- Georges R. Harik --.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,495,483 B1
APPLICATION NO. : 10/386110
DATED : July 23, 2013
INVENTOR(S) : Jeffrey A. Dean Page 1 of 1

It is certified that error appears in the above-identified patent and that said Letters Patent is hereby corrected as shown below:

On Title Page 2, Column 1, line 11 (Other Publications), please delete "idetnify" and insert therefor -- identify --;

In the Claims:

Column 8, line 3, Claim 10, please delete "ranking" and insert therefor -- ranking; --; and Column 8, line 16, Claim 10, after "in the" please insert -- target document; --.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,495,483 B1 | Page 1 of 1 |
| APPLICATION NO. | : 10/386110 | |
| DATED | : July 23, 2013 | |
| INVENTOR(S) | : Dean et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this
Twenty-seventh Day of January, 2015

Michelle K. Lee
*Deputy Director of the United States Patent and Trademark Office*